US012592811B2

(12) United States Patent
Kumagai et al.

(10) Patent No.: US 12,592,811 B2
(45) Date of Patent: Mar. 31, 2026

(54) TERMINAL AND COMMUNICATION METHOD

(71) Applicant: NTT DOCOMO, INC., Tokyo (JP)

(72) Inventors: Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 416 days.

(21) Appl. No.: 18/283,684

(22) PCT Filed: Mar. 23, 2022

(86) PCT No.: PCT/JP2022/013582
§ 371 (c)(1),
(2) Date: Sep. 22, 2023

(87) PCT Pub. No.: WO2022/220040
PCT Pub. Date: Oct. 20, 2022

(65) Prior Publication Data
US 2024/0163071 A1 May 16, 2024

(30) Foreign Application Priority Data

Apr. 13, 2021 (JP) ................................. 2021-068047

(51) Int. Cl.
*H04L 5/16* (2006.01)
*H04L 5/18* (2006.01)
(52) U.S. Cl.
CPC . *H04L 5/16* (2013.01); *H04L 5/18* (2013.01)
(58) Field of Classification Search
CPC ..................................... H04L 5/16; H04L 5/18
See application file for complete search history.

(56) References Cited

FOREIGN PATENT DOCUMENTS

| EP | 3346783 B1 * | 4/2020 | ............... H04L 5/14 |
| WO | WO-2015148997 A1 * | 10/2015 | ............ H04W 72/12 |
| WO | WO-2021020955 A1 * | 2/2021 | ............ H04W 72/23 |
| WO | WO-2022120086 A1 * | 6/2022 | .......... H04W 72/566 |

OTHER PUBLICATIONS

International Search Report issued in PCT/JP2022/013582 on Jun. 21, 2022 (5 pages).
Written Opinion of the International Searching Authority issued in PCT/JP2022/013582 on Jun. 21, 2022 (3 pages).
3GPP TS 38.300 V16.5.0; "3rd Generation Partnership Project; Technical Specification Group Radio Access Network; NR; NR and NG-RAN Overall Description; Stage 2 (Release 16)"; Mar. 2021 (151 pages).

* cited by examiner

*Primary Examiner* — Saad A. Waqas
(74) *Attorney, Agent, or Firm* — Osha Bergman Watanabe & Burton LLP

(57) ABSTRACT
A terminal includes a communication unit configured to perform communication based on half-duplex frequency division duplex; and a control unit configured to perform a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication. In this terminal, the control unit determines whether to perform the first process or the second process first, and the communication unit receives or transmits a signal that is obtained based on a result of performing at least one of the first process and the second process.

5 Claims, 9 Drawing Sheets

TERMINAL AND COMMUNICATION METHOD

FIELD OF THE INVENTION

The present invention relates to a terminal and a communication method in a wireless communication system.

BACKGROUND OF THE INVENTION

In 3GPP (3rd Generation Partnership Project), a wireless communication scheme called "5G" or "NR" (New Radio) is being discussed in order to achieve further increase of system capacity, further increase of data transmission speed, and further decrease of latency in the wireless section (Hereinafter, this wireless communication scheme is referred to as "NR"). Various wireless technologies and network architectures are being discussed (for example, Non-Patent Document 1) in order to satisfy the requirements in NR such as high system capacity, high data transmission speed, decreased latency, simultaneous access of a large number of terminals, low cost, power saving, and the like.

Also, in 3GPP standardization, a new device type with lower cost and complexity than an eMBB (enhanced Mobile BroadBand) device or a URLLC (Ultra-Reliable and Low-Latency Communications) device is being discussed as a reduced-capability NR device (hereinafter also referred to as a "RedCap UE"). Also, the RedCap UE is being discussed to support HD-FDD (Half-Duplex Frequency Division Duplex) in order to reduce the complexity.

RELATED-ART DOCUMENTS

Non-Patent Documents

[Non-Patent Document 1] 3GPP TS 38.300 V16.5.0 (2021 March)

SUMMARY OF THE INVENTION

Technical Problem

When the RedCap UE supports HD-FDD, DL (Downlink) and UL (Uplink) are placed on different carriers and are not transmitted at the same time, and thus a DL-UL switching time is expected to occur. It is therefore necessary to newly define the process for a case in which a DL channel and a UL channel are to collide and the process for a case in which UL channels are to collide.

The present invention has been made in view of the foregoing, and is intended to establish communication when channels collide in a wireless communication system.

Solution to Problem

According to the disclosed technique, a terminal is provided. The terminal includes a communication unit configured to perform communication based on half-duplex frequency division duplex; and a control unit configured to perform a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication. The control unit determines whether to perform the first process or the second process first, and the communication unit receives or transmits a signal that is obtained based on a result of performing at least one of the first process and the second process.

Advantageous Effects of Invention

According to the disclosed techniques, communication can be established when channels collide in a wireless communication system.

BRIEF DESCRIPTION OF THE DRAWINGS

FIG. 5 is a diagram illustrating an example (1) of a process for when channels overlap according to an embodiment of the present invention;

FIG. 7 is a diagram illustrating an example (3) of a process for when channels overlap according to an embodiment of the present invention;

DETAILED DESCRIPTION OF THE PREFERRED EMBODIMENTS

Hereinafter, an embodiment of the present invention will be described with reference to the accompanying drawings. The embodiment described below is an example, and the embodiments to which the present invention can be applied are not limited to the following embodiment.

In operating a wireless communication system according to an embodiment of the present invention, existing techniques may be used as appropriate. The existing techniques include, for example, existing LTE, but are not limited to existing LTE. The term "LTE" as used herein shall also have a broad meaning including LTE-Advanced, as well as successor systems of LTE-Advanced (for example, NR), unless otherwise specified.

Also, in the embodiment of the present invention described below, terms that are used in existing LTE, such as SS (Synchronization Signal), PSS (Primary SS), SSS (Secondary SS), PBCH (Physical Broadcast CHannel), PRACH (Physical Random Access CHannel), PDCCH (Physical Downlink Control CHannel), PDSCH (Physical Downlink Shared CHannel), PUCCH (Physical Uplink Control CHannel), and PUSCH (Physical Uplink Shared CHannel) are used. This is only for convenience of description, and signals, functions, and the like that are similar to these may be referred to by other names. Also, the above terms in NR correspond to NR-SS, NR-PSS, NR-SSS, NR-PBCH, NR-PRACH, and the like. However, signals for use in NR will not be always be written with the prefix "NR-".

Also, in the embodiment of the present invention, the duplex scheme may be a TDD (Time Division Duplex) scheme, an FDD (Frequency Division Duplex) scheme, or other schemes (for example, a flexible duplex scheme).

Also, in the embodiment of the present invention, when a wireless parameter or the like is "configured", this may mean that a predetermined value is configured in advance (pre-configured), or that a wireless parameter is reported and configured from a base station 10 or a terminal 20.

Figure 1:
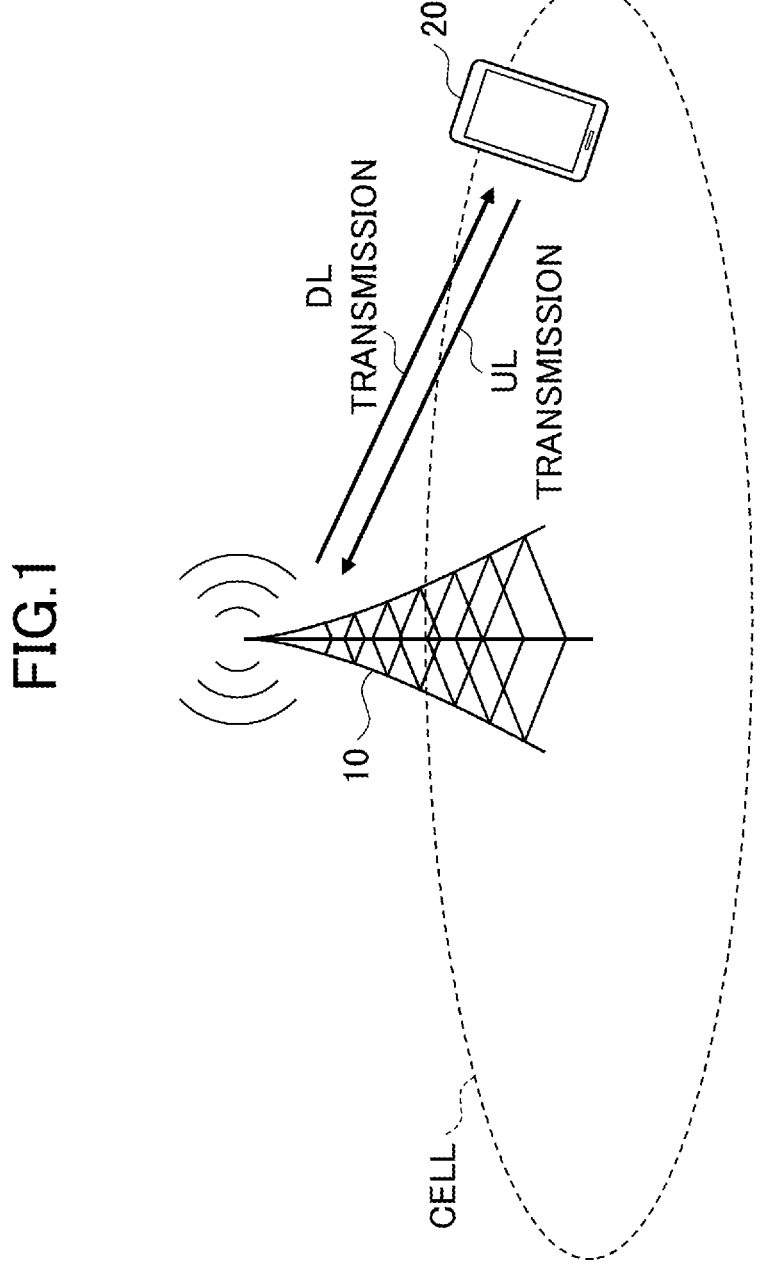
FIG. 1 is a diagram illustrating a wireless communication system according to an embodiment of the present invention.

FIG. 1 is a diagram for describing a wireless communication system according to an embodiment of the present invention. The wireless communication system according to an embodiment of the present invention includes the base station 10 and the terminal 20, as illustrated in FIG. 1. In FIG. 1, one base station 10 and one terminal 20 are illustrated, but this is an example, and there may be more than one of each.

The base station 10 is a communication device that provides one or more cells and performs wireless communication with the terminal 20. The physical resources of the radio signal are defined in the time domain and the frequency domain. The time domain may be defined in OFDM (Orthogonal Frequency Division Multiplexing) symbols, and the frequency domain may be defined in sub-carriers or resource blocks. The TTI (Transmission Time Interval) in the time domain may be a slot, or the TTI may be a subframe.

The base station 10 can perform carrier aggregation to communicate with the terminal 20 by bundling multiple cells (multiple CCs (Component Carriers)). Carrier aggregation uses one PCell (Primary Cell) and one or more SCells (Secondary Cells).

The base station 10 transmits synchronization signals, system information, and the like to the terminal 20. The synchronization signals are, for example, NR-PSS and NR-SSS. The system information is transmitted, for example, by NR-PBCH or PDSCH, and is also called broadcast information. As illustrated in FIG. 1, the base station 10 transmits the control signal or data in DL (Downlink) to the terminal 20 and receives the control signal or data in UL (Uplink) from the terminal 20. Here, what is transmitted by a control channel such as PUCCH and PDCCH is called a control signal, and what is transmitted by a shared channel such as PUSCH and PDSCH is called data, but these names are only examples.

The terminal 20 is a communication device with a wireless communication function, such as a smartphone, a cellular phone, a tablet, a wearable terminal, and an M2M (Machine-to-Machine) communication module. As illustrated in FIG. 1, the terminal 20 utilizes various communication services provided by a wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling multiple cells (multiple CCs). Carrier aggregation uses one primary cell and one or more secondary cells. Also, PUCCH-SCell with PUCCH may be used.

As mentioned earlier, in 3GPP standardization, a new device type with lower cost and complexity than an eMBB (enhanced Mobile Broadband) device or a URLLC (Ultra- Reliable and Low Latency Communications) device (hereinafter, also referred to as "RedCap UE") is being discussed as a reduced capability NR device.

For example, the RedCap UE may support a small maximum bandwidth. The RedCap UE may support a small number of receiving branches. The RedCap UE may support a small maximum number of MIMO layers. The RedCap UE may support a small modulation order. Furthermore, the RedCap UE is being discussed to support HD-FDD (Half-Duplex Frequency Division Duplex) in order to reduce the complexity.

Figure 2:
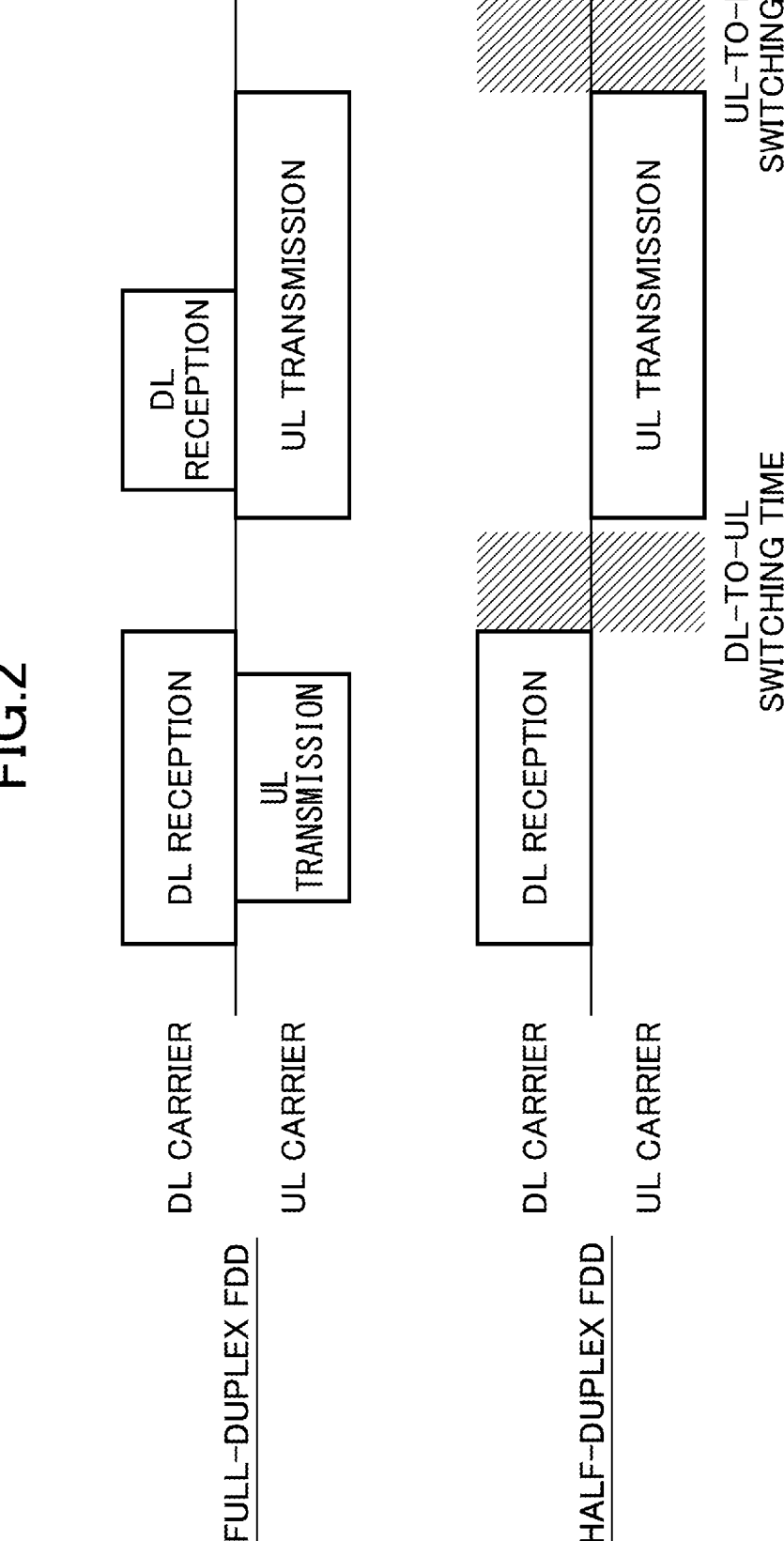
FIG. 2 is a diagram illustrating a duplex method in FDD.

FIG. 2 is a diagram illustrating a duplex method in FDD. As illustrated in FIG. 2, in FD-FDD (Full-Duplex Frequency Division Duplex), a DL carrier and a UL carrier are placed in different frequencies and can be transmitted and received at the same time. On the other hand, in HD-FDD (Full-Duplex Frequency Division Duplex), a DL carrier and a UL carrier are placed in different frequencies and cannot be transmitted and received at the same time, and therefore it takes time to switch between DL and UL. With HD-FDD, duplexers can be omitted and switches and additional filters can be used instead.

In HD-FDD, discussions are needed regarding the time for switching from DL to UL, the time for switching from UL to DL, and DL/UL collision.

Table 1 shows examples of processes related to DL/UL collision.

TABLE 1

| DL | UL | UE operation |
|---|---|---|
| Scheduled DL | Configured UL | When timeline is satisfied, configured UL is (partially) cancelled |
| Configured DL | Scheduled UL | Scheduled UL is transmitted |
| Configured DL | Configured UL | Error case |
| Scheduled DL | Scheduled UL | Error case |
| SSB | Scheduled/configured UL | Scheduled/configured UL is cancelled |
| Scheduled/configured DL | Valid RO | Scheduled/configured DL is not received |
| Collision due to DL/UL switching, that is, during transition period | | No transmission/reception is expected |

As shown in Table 1, when scheduled DL is to collide with configured UL, at least a part of the configured UL is cancelled provided that the timeline is satisfied. Also, when configured DL and scheduled UL are to collide, the scheduled UL is transmitted. The case where configured DL and configured UL are to collide is an error case. The case where scheduled DL and scheduled UL are to collide is also an error case. If an SSB is to collide with scheduled/configured UL, the scheduled/configured UL is cancelled. If scheduled/configured DL is to collide with a valid RO (Random Access Occasion), the scheduled/configured DL is not received. Also, in the event a collision is to occur due to DL/UL switching, that is, during transition period, no transmission/reception is expected.

Table 2 shows examples of priorities configured between UL channels or UL signals.

5

TABLE 2

| PUCCH | | | | |
| --- | --- | --- | --- | --- |
| SR | HARQ-ACK | CSI | PUSCH | SRS |
| RRC parameter Scheduling RequestPriority | In a case of dynamic PDSCH: PriorityIndicator in DL-DCI In a case of SPS PDSCH: RRC parameter HARQ-ACK-Codebook-Indicator-for-SPS | In a case of P/SP-CSI in PUCCH: low priority on a fixed basis In a case of A-SCI/SP-CSI: PriorityIndicator in UL-DCI | In a case of dynamic-grant PUSCH: Priority Indicator in UL-DCI In a case of configured grant PUSCH: RRC priority parameter | In a case of P-SP-SRS and A-SRS triggered by DCI format 2_3: low priority on a fixed basis |

For example, UL transmission may be configured with two levels of priority. The terminal 20 identifies the priority of UL transmission based on a field "PriorityIndicator" included in DCI, or based on an RRC priority parameter.

As shown in Table 2, the SR in PUCCH is configured by an RRC parameter "SchedulingRequestPriority". The HARQ-ACK in PUCCH is configured by Priority Indicator in DL-DCI in a case of corresponding to a dynamic PDSCH, and configured by an RRC parameter "HARQ-ACK-Codebook-Indicator-forSPS" in a case of corresponding to SPS-PDSCH. As for the CSI in PUCCH, low priority is configured on a fixed basis in a case of P/SP (Periodic/Semi-Persistent)-CSI. In a case of A (Aperiodic)-CSI or SP-CSI in PUSCH, the priority is configured by Priority Indicator in UL-DCI. As for the PUSCH, the priority is configured by Priority Indicator in UL-DCI in a case of DynamicGrant-PUSCH. In a case of ConfiguredGrantPUSCH, the priority is configured by an RRC priority parameter. In a case of P/SP-SRS and A-SRS triggered by DCI format 2_3, low priority is configured on a fixed basis.

Figure 3:
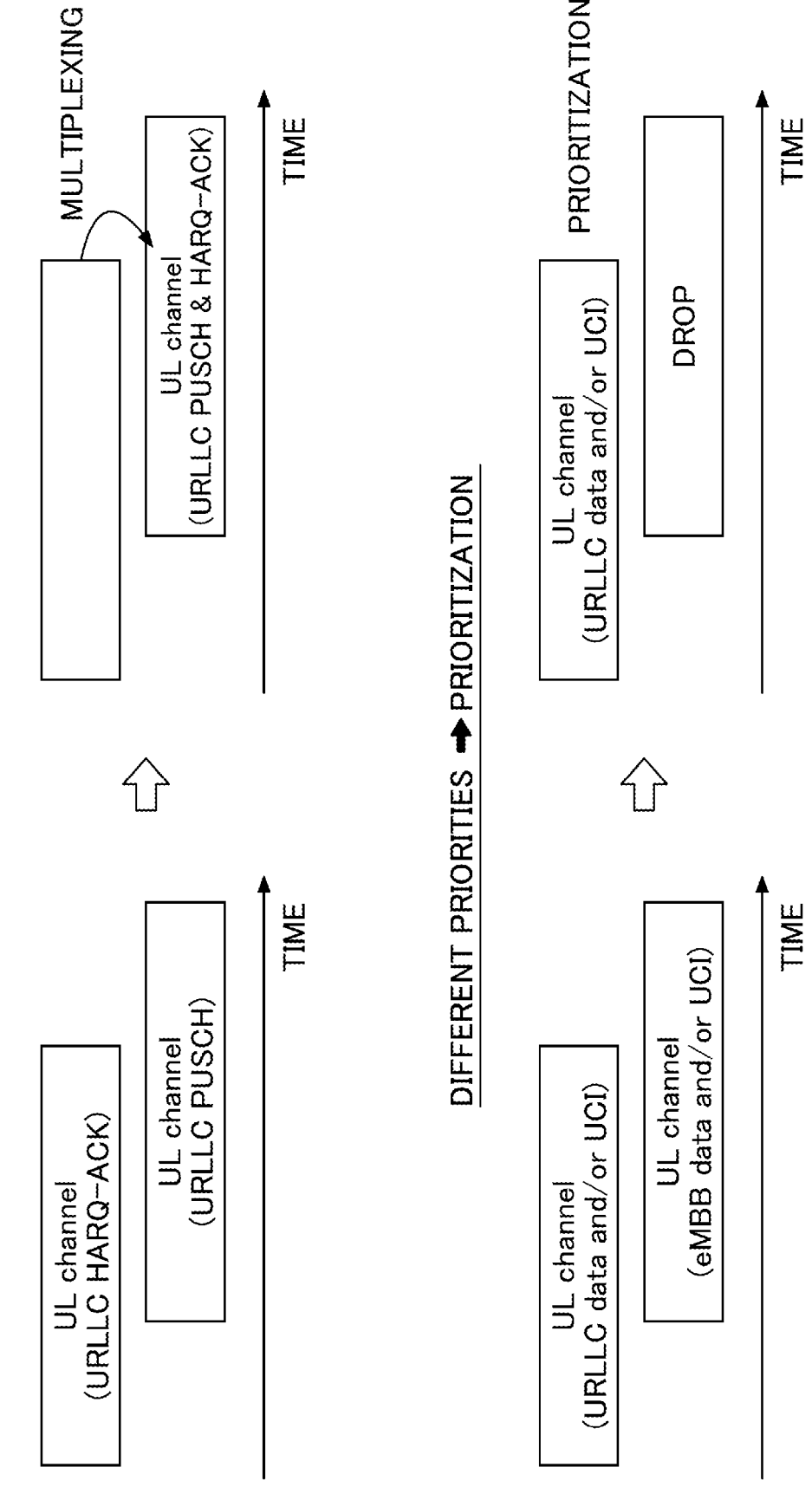
FIG. 3 is a diagram illustrating an example (1) of a process for when channels overlap.

FIG. 3 is a diagram illustrating an example (1) of the process for when channels overlap. In a case where two UL transmissions of the same priority overlap in the time domain at the terminal 20, as illustrated in FIG. 3, the UCI and the UCI or data are multiplexed into one UL channel. The multiplexing can improve the efficiency.

Also, in a case where two UL transmissions of different priorities overlap in the time domain at the terminal 20, the UCI and the UCI or data are prioritized, and the transmission of the lower priority is dropped, as illustrated in FIG. 3. When a drop occurs, the delay might increase.

Figure 4:
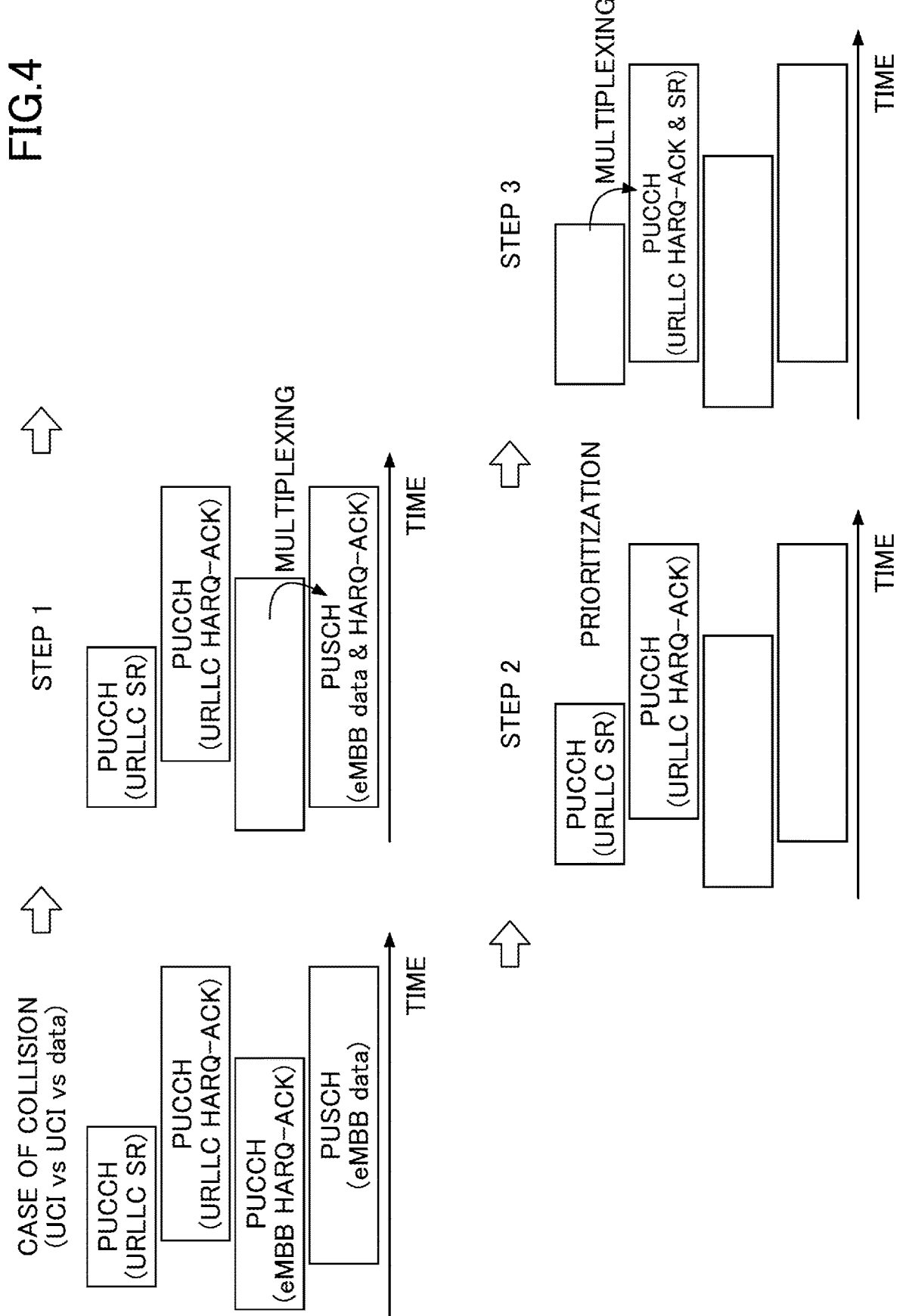
FIG. 4 is a diagram illustrating an example (2) of a process for when channels overlap.

FIG. 4 is a diagram illustrating an example (2) of the process for when channels overlap. In a case where more than two UL transmissions overlap in the time domain, the collision may be resolved by the following steps 1) to 4) described below:

Step 1) The collision between UL transmissions with lower priorities is resolved.

Step 2) The collision between UL transmissions with different priorities (if any) is resolved.

Step 3) The collision between UL transmissions with higher priorities is resolved.

Step 4) The collision between UL transmissions with different priorities is resolved.

In the case of the example illustrated in FIG. 4, in step 1, the collision between a PUCCH (eMBB HARQ-ACK) having a low priority and a PUSCH (eMBB data) having a low priority is resolved, and the PUCCH (eMBB HARQ-ACK) is multiplexed with the PUSCH (eMBB data). In subsequent step 2, the collision between UL transmissions with different priorities is resolved by prioritizing them, and the PUSCH (eMBB data & HARQ-ACK) is dropped. In subsequent step 3, the collision between a PUCCH (URLLC SR) having a high priority and a PUCCH (URLLC HARQ-ACK) having a high priority is resolved, and the PUCCH (URLLC SR) is multiplexed with the PUCCH (URLLC HARQ-ACK).

The collision-related process illustrated in FIG. 3 and FIG. 4 may be referred to as an "intra-UE prioritization process".

Also, in a case where, for example, a semi-static DL symbol and an SSB collide with UL transmission, the following two steps may be executed.

Step 1) Intra-UE prioritization including multiplexing and overriding is executed, and the final PUCCH/PUSCH is determined.

Step 2) The final PUCCH/PUSCH is cancelled in a case where the final PUCCH/PUSCH is to collide with a semi-static DL symbol and an SSB.

In a case where a RedCap UE supports HD-FDD, DL and UL are placed on different carriers and not transmitted at the same time, and thus a DL-UL switching time is expected to occur. It is therefore necessary to newly specify: the process for when a DL channel and a UL channel are to collide; and the process for when UL channels art to collide.

Therefore, in the terminal 20 supporting HD-FDD, the order of the DL/UL collision process shown in Table 1 and the intra-UE prioritization process in HD-FDD is determined.

Figure 5:
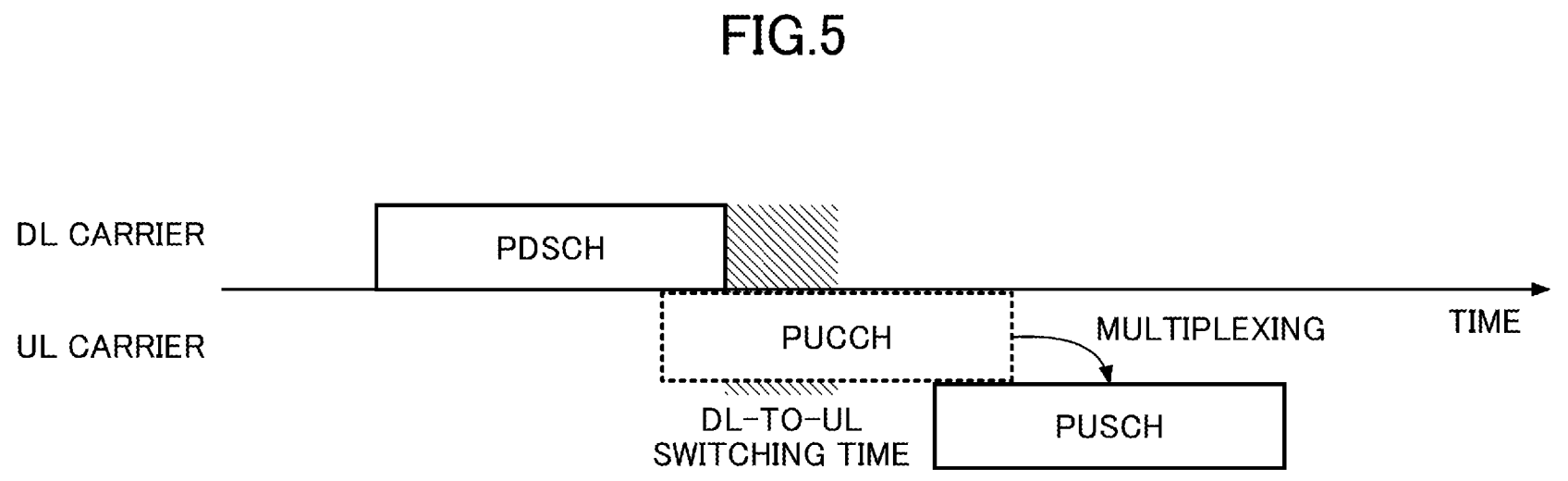

FIG. 5 is a diagram illustrating an example (1) of the process for when channels overlap according to an embodiment of the present invention. As illustrated in FIG. 5, the terminal 20 may execute the intra-UE prioritization process prior to the DL/UL collision process in HD-FDD. That is, as illustrated in FIG. 5, when a PUCCH and a PUSCH have the same priority, after the PUCCH is multiplexed with the PUSCH, the DL/UL collision process in HD-FDD may be executed. In the example of FIG. 5, the PDSCH and the multiplexed PUSCH do not overlap, and therefore the DL/UL collision process in HD-FDD is not executed. The terminal 20 receives the PDSCH and transmits the multiplexed PUSCH.

Figure 6:
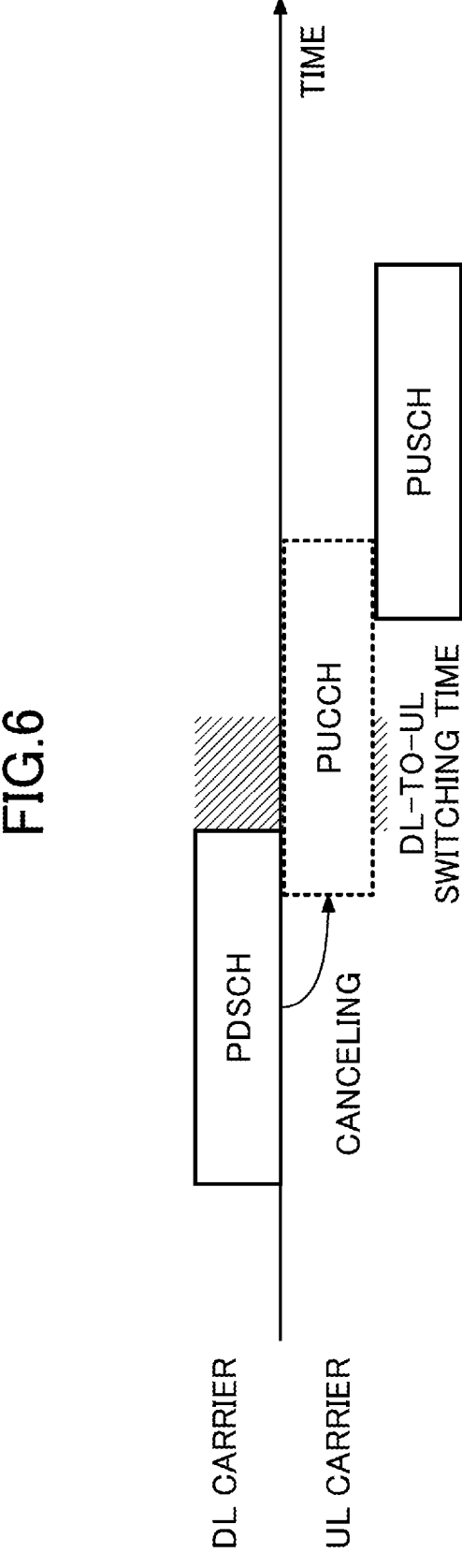
FIG. 6 is a diagram illustrating an example (2) of a process for when channels overlap according to an embodiment of the present invention.

FIG. 6 is a diagram illustrating an example (2) of the process for when channels overlap according to an embodiment of the present invention. As illustrated in FIG. 6, the terminal 20 may execute the DL/UL collision process in HD-FDD prior to the intra-UE prioritization process. That is, as illustrated in FIG. 6, a configured-PUCCH that overlaps with a scheduled PDSCH is cancelled. The UCI of the PUCCH is not multiplexed with the PUSCH. The terminal 20 receives the PDSCH and transmits the PUSCH.

Figure 7:
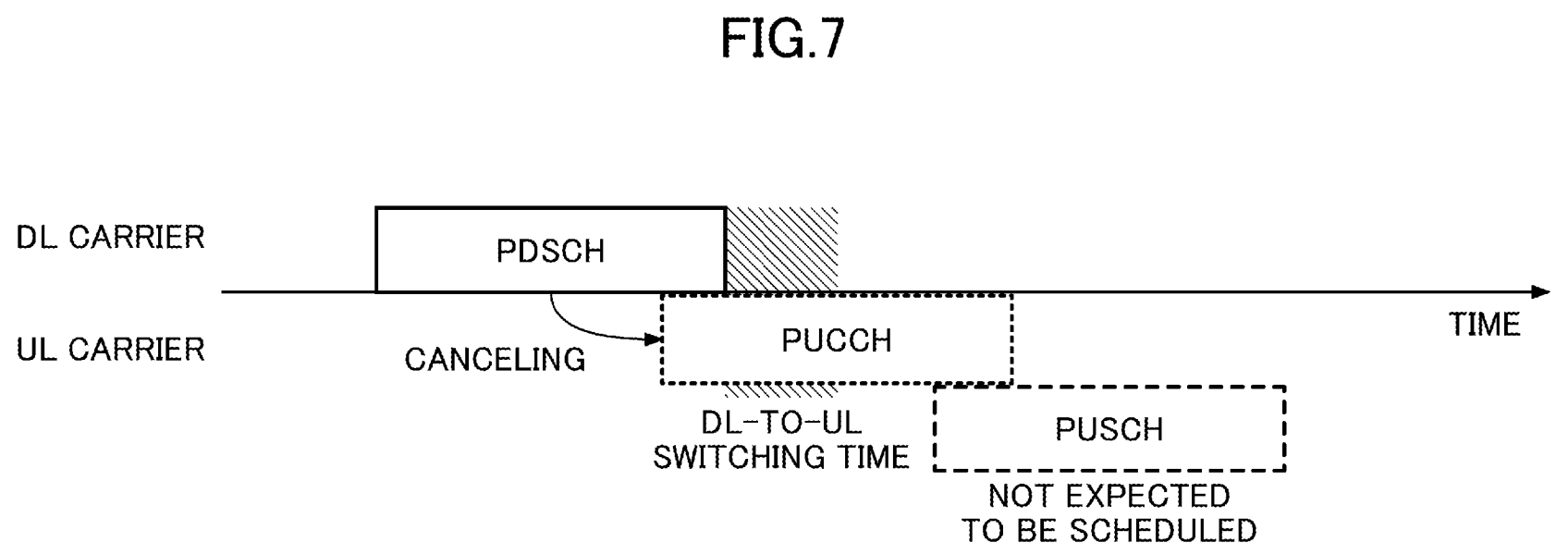

FIG. 7 is a diagram illustrating an example (3) of the process for when channels overlap according to an embodiment of the present invention. As illustrated in FIG. 7, when there is a UL signal that is the target of the DL/UL collision process in HD-FDD, the terminal 20 need not take the executing of the intra-UE prioritization process into consideration. That is, when there is a configured-PUCCH overlapping with a scheduled-PDSCH, the terminal 20 does not have to expect that a PUSCH that is the target of the intra-UE prioritization process is to be scheduled or configured.

Note that different orders of processes may be applied, or the same order of process may be applied, depending on the combination of the process targets of DL/UL signal types. For example, in a case where an SSB and a scheduled/ configured UL collide, the order of processes illustrated in FIG. 5 may be applied. Also, for example, in a case where a scheduled DL and a configured UL collide, the order of processes illustrated in FIG. 6 may be applied. That is, the terminal 20 may determine the order of the DL/UL collision process and the intra-UE prioritization process based on the types of signals.

According to the above embodiment, the terminal 20 can resolve the overlap of channels when a RedCap UE supports HD-FDD.

That is, communication can be established when channels collide in a wireless communication system.

(Device Configuration)

Next, a functional configuration example of the base station 10 and the terminal 20 for performing processes and operations described above will be described. The base station 10 and the terminal 20 include functions for executing the embodiment described above. However, each of the base stations 10 and the terminal 20 may instead include only part of the functions of the embodiment.

<Base Station 10>

Figure 8:
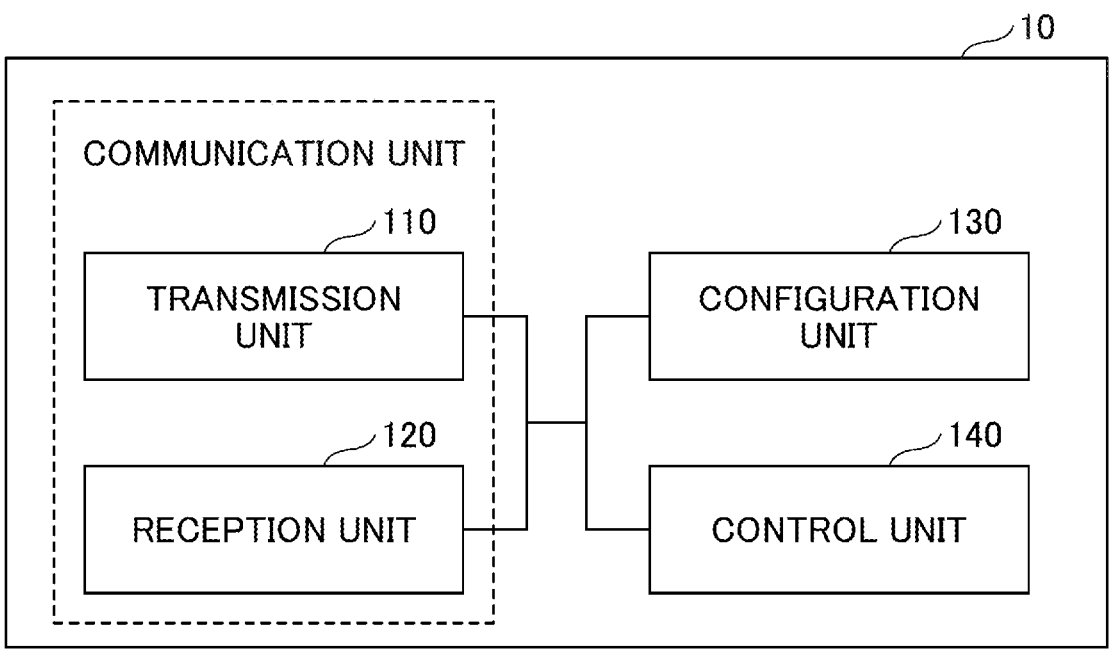
FIG. 8 is a diagram illustrating an example of a functional configuration of a base station 10 according to an embodiment of the present invention.

FIG. 8 is a diagram illustrating an example of a functional configuration of the base station 10. As illustrated in FIG. 8, the base station 10 includes a transmitter 110, a receiver 120, a configuration unit 130, and a control unit 140. The functional configuration illustrated in FIG. 8 is only one example. If the operation according to the embodiments of the present invention can be performed, any functional category and any name of the functional unit may be used. The transmitter 110 and the receiver 120 may be referred to as a communication unit.

The transmitter 110 includes a function for generating a signal to be transmitted to the terminal 20 side and transmitting the signal wirelessly. The receiver 120 includes a function for receiving various signals transmitted from the terminal 20 and acquiring, for example, information about a higher layer from the received signals. The transmitter 110 has a function to transmit NR-PSS, NR-SSS, NR-PBCH, DL/UL control signals, DL data, and the like to the terminal 20. Furthermore, the transmitter 110 transmits the configuration information described in the embodiment and the like.

The configuration unit 130 stores the configuration information prepared in advance and various configuration information to be transmitted to the terminal 20 in a storage device, and reads these information from the storage device as necessary. The control unit 140 controls, for example, resource allocation, the entirety of the base station 10, and so forth. Note that a functional unit relating to signal transmission in the control unit 140 may be included in the transmitter 110, and a functional unit relating to signal reception in the control unit 140 may be included in the receiver 120. The transmitter 110 and the receiver 120 may be called a transmitter and a receiver, respectively.

<Terminal 20>

Figure 9:
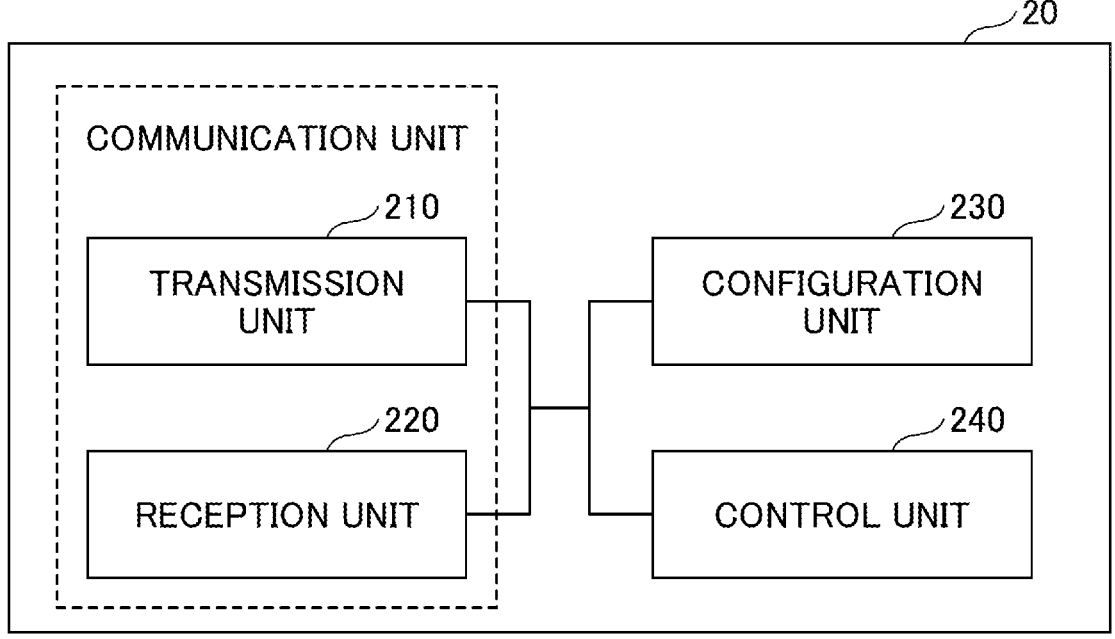
FIG. 9 is a diagram illustrating an example of a functional configuration of a terminal 20 according to an embodiment of the present invention.

FIG. 9 is a diagram illustrating an example of a functional configuration of the terminal 20. As illustrated in FIG. 9, the terminal 20 includes a transmission unit 210, a reception unit 220, a configuration unit 230, and a control unit 240. The functional configuration illustrated in FIG. 9 is only one example. If the operation according to the embodiments of the present invention can be performed, the functional category and the name of the functional unit may be any one. The transmission unit 210 and the reception unit 220 may be called a communication unit.

The transmission unit 210 creates a transmission signal from the transmission data and wirelessly transmits the transmission signal. The reception unit 220 receives various signals wirelessly and acquires signals of higher layers from the received signal of the physical layer. The transmission unit 210 transmits the HARQ-ACK, and the reception unit 220 receives the configuration information described in the embodiment.

The configuration unit 230 stores various configuration information received from the base station 10 by the reception unit 220 in the storage device, and reads the stored configuration information from the storage device as necessary. The configuration unit 230 also stores the configuration information that is prepared in advance. The control unit 240 controls the entire terminal 20 including control relating to signal transmission and reception. Note that a functional unit relating to signal transmission in the control unit 240 may be included in the transmission unit 210, and a functional unit relating to signal reception in the control unit 240 may be included in the reception unit 220. Also, the transmission unit 210 and the reception unit 220 may be called a transmitter and a receiver, respectively.

(Hardware Configuration)

Block diagrams (FIG. 8 and FIG. 9) used in the description of the above embodiments illustrate blocks of functional units. These functional blocks (components) are implemented by any combination of hardware and/or software. In addition, the implementation method of each functional block is not particularly limited. That is, each functional block may be implemented using a single device that is physically or logically combined, or two or more devices that are physically or logically separated may be directly or indirectly connected (for example, using wired, wireless, etc.) and implemented using these multiple devices. The functional block may be implemented by combining software with the device or devices.

Functions include, but are not limited to, judgment, determination, decision, calculation, computation, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, and assigning. For example, a functional block (component) that functions to transmit is called a transmitting unit or a transmitter. In either case, as described above, the implementation method is not particularly limited.

Figure 10:
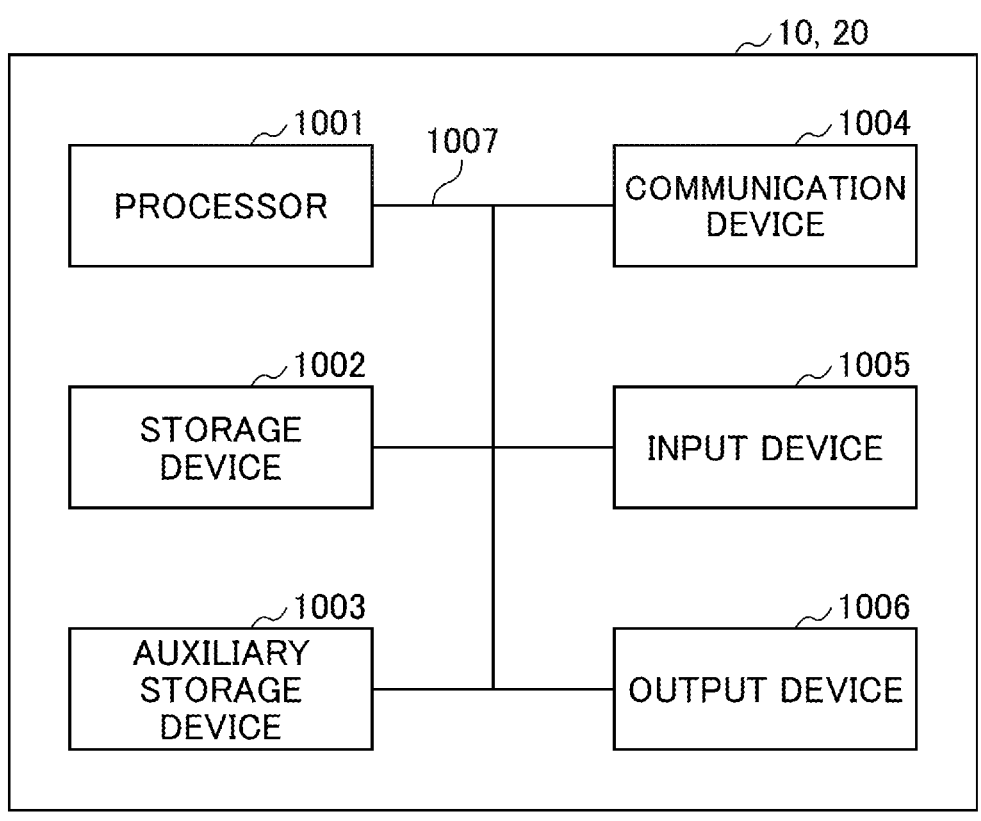
FIG. 10 is a diagram illustrating an example of a hardware configuration of the base station 10 or the terminal 20 according to an embodiment of the present invention.

For example, the base station 10, terminal 20, and so forth, according to an embodiment of the present disclosure may function as a computer for processing a wireless communication method of the present disclosure. FIG. 10 is a diagram illustrating an example of a hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuits, devices, units, and so forth. The hardware configuration of the base station 10 and terminal 20 may be configured to include one or more of the devices illustrated in the drawings or may be configured without some of the devices.

The functions in the base station 10 and the terminal 20 are realized by performing operations by the processor 1001 by reading predetermined software (programs) on hardware such as the processor 1001 and the storage device 1002, and controlling communication by the communication device

1004 and controlling at least one of reading and writing of data in the storage device 1002 and the auxiliary storage device 1003.

The processor 1001 operates, for example, an operating system to control the entire computer. The processor 1001 may be composed of a central processing unit (CPU) including an interface with peripheral devices, a control device, an arithmetic device, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication device 1004 to the storage device 1002, and performs various processing in accordance with the above. As a program, a program that causes a computer to execute at least a part of the operation described in the above embodiment is used. For example, the control unit 140 of the base station 10 illustrated in FIG. 8 may be stored in the storage device 1002 and implemented by a control program operating in the processor 1001. For example, the control unit 240 of the terminal 20 illustrated in FIG. 9 may be stored in the storage device 1002 and implemented by a control program operating in the processor 1001. Although the foregoing processes have been described and executed by one processor 1001, they may be executed simultaneously or sequentially by two or more processors 1001. The processor 1001 may be implemented by one or more chips. The program may be transmitted from the network via a telecommunication line.

The storage device 1002 is a computer-readable recording medium and may be composed of at least one of, for example, a ROM (Read Only Memory), an EPROM (Erasable Programmable ROM), an EEPROM (Electrically Erasable Programmable ROM), a RAM (Random Access Memory), and the like. The storage device 1002 may be referred to as a register, cache, main memory (main storage device device), or the like. The storage device 1002 can store programs (program codes), software modules, and so forth, executable to implement a communication method according to an embodiment of the present disclosure.

The auxiliary storage device 1003 is a computer-readable recording medium and may be composed of at least one of an optical disk, such as a CD-ROM (Compact Disc ROM), a hard disk drive, a flexible disk, a magneto-optical disk (for example, a compact disk, a digital versatile disk, a Blu-ray disk (registered trademark), etc.), a smart card, a flash memory (for example, a card, a stick, a keydrive), a floppy disk (registered trademark), a magnetic strip, and the like. The storage medium described above may be, for example, a database, a server, or other suitable medium that includes at least one of a storage device 1002 and an auxiliary storage device 1003.

The communication device 1004 is hardware (a transceiving device) for performing communication between computers via at least one of a wired network and a wireless network, and is also referred to as a network device, a network controller, a network card, a communication module, or the like. The communication device 1004 may be composed of a high frequency switch, duplexer, filter, frequency synthesizer, or the like, for example, to implement at least one of frequency division duplex (FDD) and time division duplex (TDD). For example, the transmitting/receiving antenna, the amplifier unit, the transceiving unit, the transmission line interface, and the like may be implemented by the communication device 1004. The transceiving unit may be physically or logically isolated implementations of a transmission unit and a reception unit.

The input device 1005 is an input device (for example, a keyboard, mouse, microphone, switch, button, sensor, etc.) that accepts external input. The output device 1006 is an output device (for example, a display, speaker, LED lamp, etc.) that implements external output. The input device 1005 and the output device 1006 may have an integral configuration (for example, a touch panel).

Each device, such as the processor 1001 and the storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array), and some or all of the functional blocks may be implemented by the hardware. For example, the processor 1001 may be implemented using at least one of these hardware components.

Summary of Embodiment

As described above, according to an embodiment of the present invention, a terminal is provided. The terminal includes: a communication unit configured to perform communication based on half-duplex frequency division duplex; and a control unit configured to perform a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication. The control unit determines whether to perform the first process or the second process first, and the communication unit receives or transmits a signal that is obtained based on a result of performing at least one of the first process and the second process.

With the above configuration, the terminal 20 can resolve channel overlap when a RedCap UE supports HD-FDD. That is, communication can be established when channels collide in a wireless communication system.

The control unit may perform the second process before the first process. With this configuration, the terminal 20 can resolve channel overlap when a RedCap UE supports HD-FDD.

The control unit may perform the first process before the second process. With this configuration, the terminal 20 can resolve channel overlap when a RedCap UE supports HD-FDD.

The control unit may determine whether to perform the first process or the second process first, based on the types of the signals. With this configuration, the terminal 20 can resolve channel overlap when a RedCap UE supports HD-FDD.

Further, according to an embodiment of the present invention, there is provided a communication method performed by a terminal. The communication method includes: performing communication based on half-duplex frequency division duplex; and performing a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication, determining whether to perform the first process or the second process first, and receiving or transmitting a signal that is obtained based on a result of performing at least one of the first process and the second process.

With the above configuration, the terminal 20 can resolve channel overlap when a RedCap UE supports HD-FDD. That is, communication can be established when channels collide in a wireless communication system.

Notes on Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a RAM (Random Access Memory), a flash memory, a ROM (Read-Only Memory), an EPROM, an EEPROM, a register, an HDD (Hard Disk Drive), a removable disk, a CD-ROM, a database, a server, or any other appropriate storage medium.

Furthermore, notification of information is not limited to the aspect or embodiment described in the present disclosure and may be provided by using any other method. For example, the notification of information may be provided by physical layer signaling (for example, DCI (Downlink Control Information) or UCI (Uplink Control Information)), higher layer signaling (for example, RRC (Radio Resource Control) signaling, MAC (Medium Access Control) signaling, broadcast information (MIB (Master Information Block), SIB (System Information Block), etc.), other signals, or a combination thereof. Furthermore, RRC signaling may be referred to as an RRC message and may be, for example, an RRC connection setup message, an RRC connection reconfiguration message, or the like.

Each aspect and embodiment described in the present disclosure may be applied to at least one of LTE (Long Term Evolution), LTE-A (LTE-Advanced), SUPER 3G, IMT-Advanced, 4G (4th Generation mobile communication system), 5G (5th Generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using any other appropriate system, and next generation systems extended based on these standards. Furthermore, a plurality of systems (for example, a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (for example, MME and S-GW).

Information, a signal, or the like described in the present disclosure may be output from a higher layer (or a lower layer) to a lower layer (or a higher layer). Information, a signal, or the like described in the present disclosure may be input and output via a plurality of network nodes.

Input and output information and the like may be stored in a specific place (for example, a memory) or may be managed by using a management table. Input and output information and the like may be overwritten, updated, or additionally written. Output information and the like may be deleted. Input information and the like may be transmitted to another device.

The determination in the present disclosure may be made in accordance with a value (0 or 1) indicated by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a DSL (Digital Subscriber Line)) and a radio technology (such as infrared rays or a microwave), at least one of these wired technology and radio technology is included in a definition of a transmission medium.

Information, signals, and the like described in the present disclosure may be expressed using any one of a variety of different techniques. For example, data, instructions, commands, information, signals, bits, symbols, chips, and the like which are mentioned throughout the above description may be expressed by voltages, currents, electromagnetic waves, magnetic fields or magnetic particles, optical fields or photons, or any combination thereof.

The terms described in the present disclosure and terms necessary for understanding the present disclosure may be replaced with terms having the same or similar meanings. For example, at least one of a channel and a symbol may be a signal (signaling). Furthermore, a signal may be a message. Furthermore, a component carrier (CC: Component Carrier) may be referred to as a "carrier frequency", a "cell", a "frequency carrier", or the like.

The terms "system" and "network" used in the present disclosure are used interchangeably.

Furthermore, information, parameters, and the like described in the present disclosure may be expressed by using absolute values, may be expressed by using relative values from predetermined values, or may be expressed by using any other corresponding information. For example, radio resources may be those indicated by an index.

The names used for the above-described parameters are not limited names in any point of view. Furthermore, mathematical formulas or the like using the parameters may be different from those explicitly disclosed in the present disclosure. Since various channels (for example, a PUSCH, a PUCCH, a PDCCH, etc.) and information elements can be identified by any suitable names, various names assigned to the various channels and the information elements are not limited names in any point of view.

In the present disclosure, the terms "base station (BS: Base Station)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to by a term such as a macrocell, a small cell, a femtocell, and a picocell.

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS: Mobile Station)", "user terminal", "user equipment (UE)", "terminal", and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmission device, a reception device, a communication device, or the like. At least one of the base station and the mobile station may be a device installed in a mobile body, a mobile body itself, or the like. The mobile body may be a vehicle (for example, a car, an airplane, etc.), an unmanned body that moves (for example, a drone, an autonomous car or the like), or a robot (manned type or unmanned type). At least one of the base station and the mobile station includes a device that need not move during a communication operation. For example, at least one of the base station and the mobile station may be an Internet of Things (IoT) device such as a sensor.

Furthermore, the base station in the present disclosure may be replaced by the user terminal. For example, various aspects/embodiments of the present disclosure may be applied for a configuration in which communication between the base station and the user terminal is replaced by communication between multiple terminals 20 (such communication may be referred to as D2D (Device-to-Device), V2X (Vehicle-to-Everything), etc.). In this case, the terminals 20 may have the functions provided by the base station 10 described above. The phrases "uplink" and "downlink" may also be replaced by the phrases corresponding to terminal-to-terminal communication (for example, "side"). For example, an uplink channel, a downlink channel, or the like may be replaced by a side channel.

Similarly, the user terminal in the present disclosure may be replaced with the base station. In this case, the base station may have the functions of the above-described user terminal.

The terms "determination (determining)" and "decision (determining)" used in the present specification may include various types of operations. The "determination" and "decision" may include deeming "judging", "calculating", "computing", "processing", "deriving", "investigating", "looking up/search/inquiry (for example, searching in a table, a database, or another data structure)", "searching", "inquiring", or "ascertaining" as "determining" and/or "deciding". Furthermore, the "determination" and "decision" may include deeming "receiving (for example, receiving information)", "transmitting (for example, transmitting information)", "inputting", "outputting", or "accessing (for example, accessing data in a memory)" as "determining" and/or "deciding". Furthermore, the "determination" and "decision" may include deeming "resolving", "selecting", "choosing", "establishing", or "comparing" as "determining" and/or "deciding". Namely, the "determination" and "decision" may include deeming an operation as "determining" and/or "deciding". Furthermore, "determining" may be replaced with "assuming", "expecting", "considering", or the like.

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connection" may be replaced with "access". In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on a standard to be applied.

A phrase "based on" used in the present disclosure is not limited to "based only on" unless otherwise stated. In other words, a phrase "based on" means both "based only on" and "based on at least".

Any reference to an element using a designation, such as "first" or "second", used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above devices may be replaced with "unit", "circuit", "device", or the like.

When "include", "including", and variations thereof are used in the present disclosure, these terms are intended to be comprehensive, similar to a term "provided with (comprising)". Furthermore, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like.

The slot may include one or more symbols (OFDM (Orthogonal Frequency Division Multiplexing) symbols, SC-FDMA (Single Carrier Frequency Division Multiple Access) symbols, etc.) in the time domain. The slot may be a time unit based on the numerology.

The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B.

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in existing LTE, may be a period shorter than 1 ms (for example, 1 to 13 symbols), or may be a period longer than 1 ms. A unit representing the TTI may be referred to as a slot, a mini slot, or the like, instead of the subframe.

Here, for example, the TTI refers to a minimum time unit of scheduling in wireless communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel-coded data packet (transport block), a code block, or a codeword, or may be a processing unit of, for example, scheduling or link adaptation. Furthermore, when a TTI is provided, a time interval (for example, the number of symbols) in which a transport block, a code block, a codeword, or the like is actually mapped may be shorter than the TTI.

When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, etc.) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain, and may include one or more consecutive subcarriers in the frequency domain. The number of subcarriers included in an RB may be the same, irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. One TTI, one subframe, or the like may be formed of one or more resource blocks.

Furthermore, one or more RBs may be referred to as a physical resource block (PRB: Physical RB), a subcarrier group (SCG: SubCarrier Group), a resource element group (REG: Resource Element Group), a PRB pair, an RB pair, or the like.

Furthermore, the resource block may be formed of one or more resource elements (RE: Resource Element). For example, one RE may be a radio resource field of one subcarrier and one symbol.

A bandwidth part (BWP: Bandwidth Part) (which may be referred to as a partial bandwidth or the like) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include BWP for UL (UL BWP) and BWP for DL (DL BWP). In the terminal 20, one or more BWPs may be configured in one carrier.

At least one of configured BWPs may be active, and the UE need not assume that predetermined signals/channels are transmitted and received outside an active BWP. Furthermore, a "cell", a "carrier", or the like in the present disclosure may be replaced with a "BWP".

Structures of the radio frame, the subframe, the slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP: Cyclic Prefix) length, and the like can be variously changed.

In the present disclosure, for example, when an article such as "a", "an", or "the" in English is added by a translation, the present disclosure may include a case in which a noun following the article is the plural.

In the present disclosure, the term "A and B are different" may mean "A and B are different from each other". Incidentally, the term may mean "A and B are different from C". Terms such as "separated" or "combined" may be interpreted as well as "different".

Each aspect/embodiment described in the present disclosure may be used alone, in combination, or may be switched in accordance with the execution. Furthermore, notification of predetermined information (for example, notification of "being X") is not limited to notification performed explicitly, but may be performed implicitly (for example, not notifying the predetermined information).

Although the present disclosure is described above in detail, it is obvious to those skilled in the art that the present disclosure is not limited to the embodiment described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

The present international patent application is based on and claims priority to Japanese patent application No. 2021-068047, filed on Apr. 13, 2021, the entire contents of which are hereby incorporated herein by reference.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:
a communication unit configured to perform communication based on half-duplex frequency division duplex; and
a control unit configured to perform a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication,
wherein the control unit determines whether to perform the first process or the second process first, and
wherein the communication unit receives or transmits a signal that is obtained based on a result of performing at least one of the first process and the second process.

2. The terminal according to claim 1, wherein the control unit performs the second process before the first process.

3. The terminal according to claim 1, wherein the control unit performs the first process before the second process.

4. The terminal according to claim 1, wherein the control unit determines whether to perform the first process or the second process first based on types of the signals.

5. A communication method to be performed by a terminal, the method comprising:
performing communication based on half-duplex frequency division duplex;
performing a first process and a second process, the first process being performed to determine a signal to receive or a signal to transmit when a downlink signal and an uplink signal overlap in a time domain during the communication, and the second process being performed to determine the signal to transmit when a plurality of uplink signals overlap in the time domain during the communication;
determining whether to perform the first process or the second process first; and
receiving or transmitting a signal that is obtained based on a result of performing at least one of the first process and the second process.

* * * * *